Inventors:
ULF ESSERS, GUENTER HEYER,
ACHIM ROCKSCHIES, NORBERT ADOLPH
by Burgess, Dinklage & Sprung
Attorneys

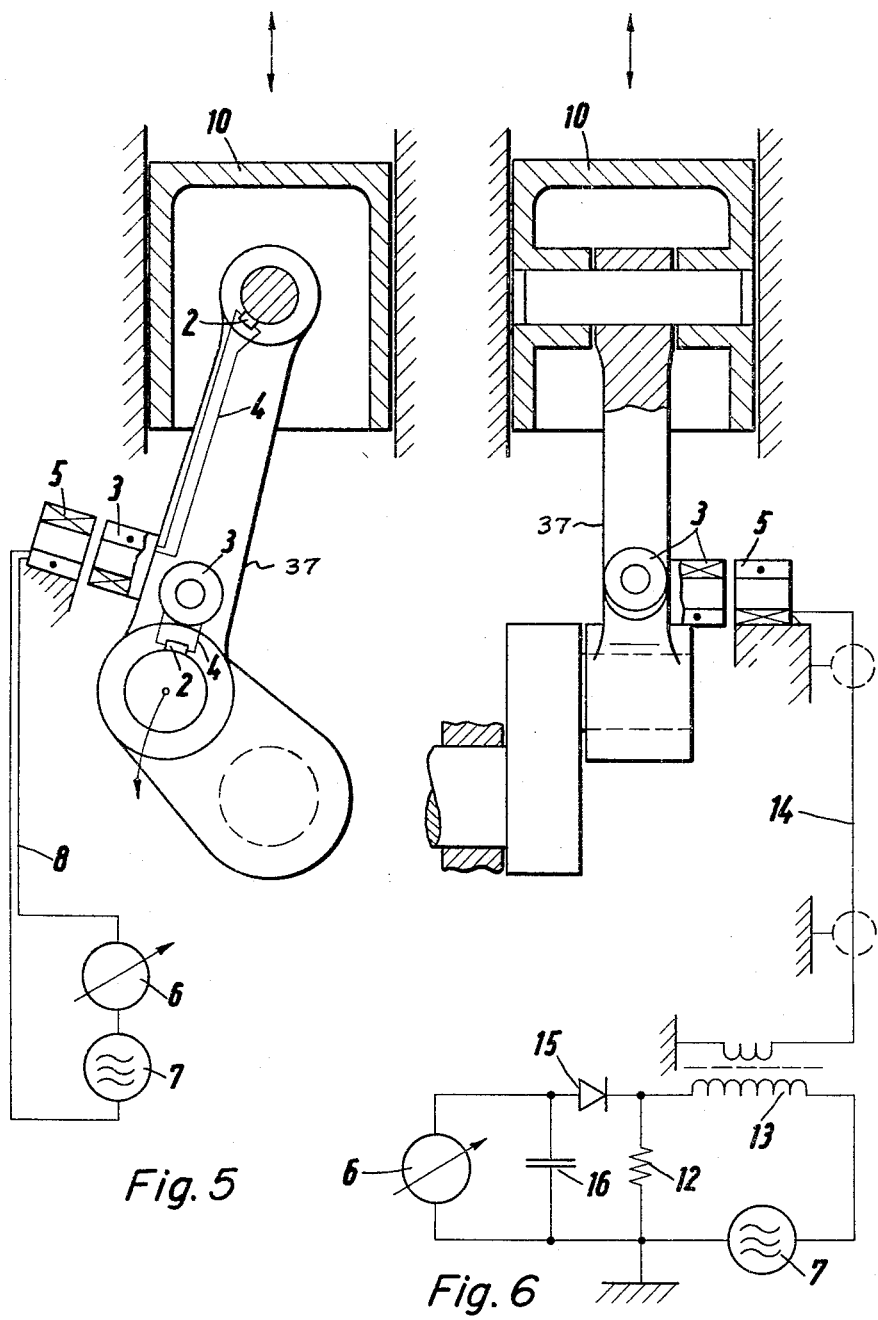

June 13, 1967  U. ESSERS ET AL  3,324,724
MEASURING APPARATUS

Filed Oct. 9, 1964  4 Sheets-Sheet 4

Inventors:
ULF ESSERS, GUENTER HEYER,
ACHIM ROCKSCHIES, NORBERT ADOLPH
by Burgess, Dinklage & Sprung
ATTORNEYS United States Patent Office 3,324,724
Patented June 13, 1967

3,324,724
MEASURING APPARATUS
Ulf Essers, Guenter Heyer, Achim Rockschies, and Norbert Adolph, all of Aachen, Germany, assignors to Karl Schmidt, G.m.b.H., Neckarsulm, Germany, a corporation of Germany
Filed Oct. 9, 1964, Ser. No. 402,776
Claims priority, application Germany, Oct. 16, 1963, E 25,689
4 Claims. (Cl. 73—362)

The invention relates to an electrical measuring apparatus for the measurement of physical parameters on moving bodies by means of stationary indicating and recording apparatus.

The transmission of physical measurements from moving bodies to stationary recording and indicating apparatus is preferably performed by methods requiring no physical contact, when the movements involved are rapid. The transmission of such measurements through flexible leads or through contacts is generally unsatisfactory for various mechanical reasons, such as the limited flexing ability of flexible leads, and wear and contact bounce in the case of electrical contacts.

In one well known method of contact-less transmission, measurements are transmitted inductively from rotating shafts by a coaxial arrangement of stationary and moving coils. This method is essentially limited to arrangements in which the coil axes coincide with the axis of the revolving shaft.

For other arrangements of the transmission coils, such as are frequently necessary for constructional reasons, in particular applications the measuring apparatus of the present state of the art are not entirely satisfactory, because either a speed-induced variation of the voltage induced in the stationary coil must be reckoned with, compensating means, such as a null compensator, must be provided, thereby complicating the apparatus. Such compensation makes the measurement and recording of variables subject to errors. Furthermore, satisfactory null compensation is possible only when coils are used which are supplied by direct current. In the case of contact-less transmission, this means that active transducers must be used. Quasi-active transducers, which operate on batteries, are generally impractical, because in many problems of measurement, high ambient temperatures occur, or because long operation is often required, or because such parts of the measuring apparatus cannot be accommodated in the space available.

Thermoelectric elements, though they are used very frequently as active transducers, permit precise measurements only when a cold junction is present which is defined with reference to temperature. As a rule, however, this is not the case with moving objects being measured. Furthermore, the undesirable influence of remanence on accuracy of measurement cannot be excluded in the case of magnets energized by direct current. Another method that has become known for the contact-less transmission of measurements from moving bodies to stationary recording and measuring apparatus operates with a moving sender modulated by the measurement values and a stationary receiver. Owing to the necessity of operating on batteries and of mounting a number of temperature-sensitive and acceleration-sensitive components on the moving body, this method is greatly limited in its application.

The problem of creating an electrical measuring device for measurements on bodies which move on any given curved paths, in which the advantages of contact-less transmission are obtained, but disadvantages such as variations in the readings due to rotatory speed, the necessity for using null compensation, the influence of residual magnetism, and the use of batteries and other sensitive and bulky components on the moving body, are avoided, is solved according to the invention by providing one or more passive transducers moving with the body and which are coupled intermittently by one or more magnetic alternating fields to one or more stationary alternating current generators and one or more stationary recording or indicating devices.

Passive transducers are those in which the variation of the physical magnitude being measured results in a change of resistance, a change of inductance, a change of capacitance or a change in magnetic magnitudes.

Not only metal resistors but also NTC [negative temperature coefficient] resistors can be used for the measurement of temperatures.

The passive transducers are connected by leads to one or more coils arranged at appropriate points. These coils and passive transducers on the moving body form the secondary part, or circuit, of the measuring apparatus. Due to relatively few components disposed on the moving body, little space is required. These components can be constructed so as to be insensitive to harmful temperature effects. The life of these components is unlimited as far as the measuring process is concerned.

The stationary primary circuit of the measuring apparatus consists of an A.C. generator, which is connected by conductors, through a recording or indicating apparatus, to one or more stationary coils associated with the moving coils of the secondary circuit.

The power put out by the A.C. generator, which depends upon the loading of the generator, is intermittently transmitted to the secondary circuit by coupling between the stationary and moving coils. The secondary circuit then works as a load on the primary circuit. This reaction of the secondary circuit on the primary circuit depends upon the electrical characteristics of a passive transducer which is responsive to a particular physical parameter and thus represents the value of the parameter to be measured. A recording or indicating instrument for the measurement of current or voltage is provided in the primary circuit for the measurement of the above-mentioned reaction. If the frequency of the A.C. generator is sufficiently high, the realtive speed between the primary and secondary coils has no measurable influence on the magnitude of the voltage induced in the secondary circuit. Therefore, this measuring system is suitable both for low and for very high relative coil velocities.

Because the measuring apparatus of the invention requires no null compensation, it is also suitable for the measurement of rapidly changing magnitudes, since the momentary value of the physical magnitude is measured in each coupling action.

Whereas previously, the contact-less transmission of measurements by fields of force energized by alternating current has been performed only from rotating shafts by a coaxial coil arrangement with an expressly required constant coupling of the coils, the measuring apparatus of the invention makes it possible with intermittent coupling to perform the measurement on bodies moving on paths of any given curvature.

The limitation due to the intermittent transmission of the measurements, whereby the measurement can be transmitted only once in each period rather than continuously, is not important in many cases, and particularly in most temperature measurements. This limitation can, if necessary, be substantially reduced by the use of a larger number of primary coils or by the use of a larger number of secondary coils connected with the same passive transducer. On the other hand, this limitation makes possible the transmission of a large number of measurements using only one primary circuit if, according to a further improvement of the invention, during a single period of a movement, a corresponding number of secondary coils, each connected with a transducer, are coupled with the primary coil. This is especially important in those cases in which very little space is available for the transmission elements. The selector switches operated by servomotors which have been used hitherto in such cases, and which make possible the step-wise interrogation of the various points of measurement, using only one pair of coils, have not always been satisfactory as regards reliability of operation. The measuring apparatus of the invention not only replaces them with equipment of equal value, but also greatly excels them as regards speed of interrogation, because each magnitude is measured at least once in each period. In the case of movements involving a backward movement and a forward movement of identical trajectory, each moving coil can be interrogated twice per period by an associated stationary coil, if the coupling is not performed at a point of reversal. In the case of such movements, the coils to be coupled are so designed according to an improvement of the invention that the one coil plunges into or through the other coil. This arrangement has the advantage that any mutual axial displacement of the coil axes has no influence on the accuracy of measurement.

A further advantage of intermittent interrogation is that any changes in the position of the null point, which can be produced by many causes, will not influence the results of the measurement, because it is a peak value measurement that is performed.

If the alternating current generator and the indicating or recording instrument with their corresponding components are to be set up remotely from the stationary coils, the stationary coils are connected to the primary circuit by matching high-frequency cable.

Since in the intermittent coupling according to the invention, the peak values of current or voltage, which occur at the moment of maximum coupling, represent the value of the physical parameter that is to be measured, it is expedient to use peak-value indicating or recording instruments.

For certain measurement applications, the use of passive transducers arranged in a bridge circuit on the moving body is expedient. In this case, two stationary and two moving coils are used for each bridge.

One disadvantage of contact-less temperature measuring techniques using thermocouples, namely the fact that the temperature of the reference junction cannot be determined by measurement, is eliminated according to the invention by transmitting the temperature of the reference junction by means of a passive temperature transducer disposed in close proximity thereto.

If an active transducer is to be used for the measurement of the physical parameter, the contact-less transmission according to the invention can be provided by a circuit arrangement wherein the current or voltage from the active transducer signal controls the effective loading produced by a passive transducer.

It is therefore an object of the invention to provide an apparatus which will measure the values of physical parameters on moving bodies and transfer the measurement data electrically to stationary indicating and/or recording equipment via contact-less coupling elements.

Another object of the invention is to provide a measuring apparatus as aforesaid wherein the parametric measurements are performed by transferring electrical energy from a stationary source through a contact-less coupling element to a passive transducer load element on the moving body, the effective loading of said transducer being dependent upon the value of the parameter to be measured, whereby the value of said parameter can be determined by a stationary indicator which measures the energy supplied to said passive transducer.

Another and further object of the invention is to provide an apparatus as aforesaid wherein an active transducer which senses the value of the parameter to be measured is used to control the effective loading of a passive transducer, both transducers being on the moving body, so that the value of said parameter can be determined by a stationary indicator from the amount of energy transferred through a contact-less coupling to the passive transducer load.

Still other and further objects and advantages of the invention will become apparent from the following detailed description and accompanying drawings in which:

FIG. 5 is a schematic illustration, partly in section, of a measuring apparatus according to a further embodiment of the invention, which is adapted for parameter value measurements on a piston connecting rod body which executes combined rotary and translatory motion.

FIG. 6 is a schematic illustration of the basic measuring apparatus and piston rod shown in FIG. 5, as seen parallel to the plane of connecting rod motion, and showing an alternate circuit associated with one of the stationary coupling coils therein.

Figure 1:
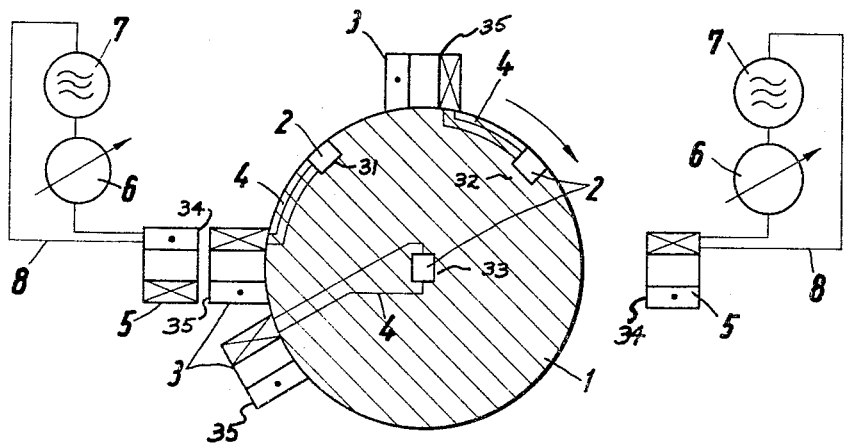
FIG. 1 is a schematic representation, partly in section, of a measuring apparatus according to a preferred embodiment of the invention, and adapted for parameter value measurements on a rotatably moveable body via coupling coils with axes normal to the body axis of rotation.

Referring now to FIG. 1, wherein parametric measurements are to be made on a rotating body, such as a shaft 1, by passive transducers 2, located at the points 31, 32 and 33 on said shaft 1. The passive transducers 2 are connected to their corresponding coils 3 by pairs of conductors 4. By way of example only, two stationary coils 5 are provided, each of which are connected to corresponding indicators 6 and alternating current generators 7 by conductors 8. The combination of each coil 5 with its corresponding indicator 6 and generator 7, which are also stationary, may be regarded as a primary circuit, and the combination of each coil 3 with its corresponding transducer 2 on the shaft may be regarded as a secondary circuit. The coils 3 are affixed to the shaft 1 so that their individual axes are normal to the axis of rotation of said shaft 1. The coils 5 are fixedly disposed so that their respective axes are also normal to the shaft 1 axis of rotation, and are arranged so that their ends 34 are in adjacent spaced relation to the ends 35 of the coils 3, intermittently as the shaft 1 rotates. It is not necessary that the coils 3 be located at a common axial station on the shaft 1 as is shown in FIG. 1. However, if it is desired to locate the coils 3 at different axial stations on the shaft 1, it is necessary that their corresponding coils 5 be accordingly located so that the coils 3 can be inductively coupled to their intended stationary coils 5. To reduce stray magnetic fields, the coils 3 and 5 can be provided with magnetic cores.

During each revolution, the coils 3 come successively into positions of intermittent maximum coupling with each of the two stationary coils 5, namely the positions in which the axes of the coils 3 and 5 are aligned with one another, this being the position in which the measurement data is transferred from the secondary circuit on the shaft 1 to the stationary primary circuits.

In the arrangement illustrated, each coil 3 is interrogated for measurement data twice during each shaft 1 revolution, with a phase displacement of 180 degrees between successive interrogations.

If desired, additional primary circuits or a single primary circuit may be used to provide other interrogation frequencies and phase relations.

In the measuring apparatus of the invention, electrical energy flows from a primary circuit through a contactless coupling means such as the coils 3 and 5 to a secondary circuit, whereas the information flow is from the secondary circuit to the primary circuit, and is without any energy transfer. Thus, the apparatus according to the invention is distinguished from other measuring apparatus wherein the information flow is accompanied by an energy flow in the same direction, such as for example conventional telemetering apparatus using active transducers to sense values of physical parameters.

Basically, the measuring apparatus of the invention performs its measurement functions by energy absorption metering. Accordingly, the passive transducers 2 which load the coils 3 are so constructed as to produce an effective loading on the coils 3 which varies as a function of the value of the parameters which they sense. For example, the conventional resistive strain gage has a resistance which varies as a function of the elongation of a member to which it is affixed. Thus by measuring the resistance of such a strain gage, the elongation, or strain of such a member can be readily determined. Such passive transducers 2 are by no means limited to resistive elements, or to the measurement of physical displacements, and other types of transducers 2, such as capacitors and indicators which sense the values of other types of physical parameters can be used in the invention. Neither does the invention require that the transducers 2 have linear responses to the parameters which they sense. For example, where it is desired to determine whether a particular parameteric condition has occurred, a switch (not shown) may be used as a passive transducer 2, said switch being normally open and closed by the occurrence of the parametric condition.

In the invention, the load impedance of the transducers 2 is determined from the electrical energy absorption of the secondary circuit, as measured by the indicators 6 in the primary circuit. Thus, when the coils 3 and 5 are displaced so as to have substantially zero coupling, very little power will be delivered by the generator 7 to the coil 5. When corresponding coils 3 and 5 have maximum coupling during the rotation of the shaft 1, an amount of power dependent upon the loading produced by the connected passive transducer 2 will be delivered by the generator 7 to the coil 5 and transferred inductively to the coil 3 and transducer 2. Since the transducer 2 loading corresponds to the value of the parameter it senses, this loading can be determined by the indicator 6 from the energy delivered by the generator 7, thereby eliminating any necessity for direct measurement of the load impedance of said transducer 2.

Depending upon the voltage-current characteristics of the generator 7, the indicator 6 may be either a voltmeter, an ammeter, or a watt-meter. As shown in FIG. 1, the indicator 6 is connected in series with the output of the generator 7, like an ammeter. Where the generator 7 is of the constant voltage type, a measurement of its current output is equivalent to a measurement of its power output, the two being related by a factor equal to the constant voltage. If, for example, the generator 7 is a constant current type, a voltmeter type indicator 6 connected in shunt (not shown) across its output would be used. In general, the indicator 6 can be a watt-meter and have a shunt as well as a series connection to the generator 7.

To minimize the effect of flux variations due to the relative motion of the coils 3 and 5, the frequency of the alternating current generator 7 can be made sufficiently high so that any errors introduced into the measurement by reason of such relative motion are negligible.

Figures 2, 3:
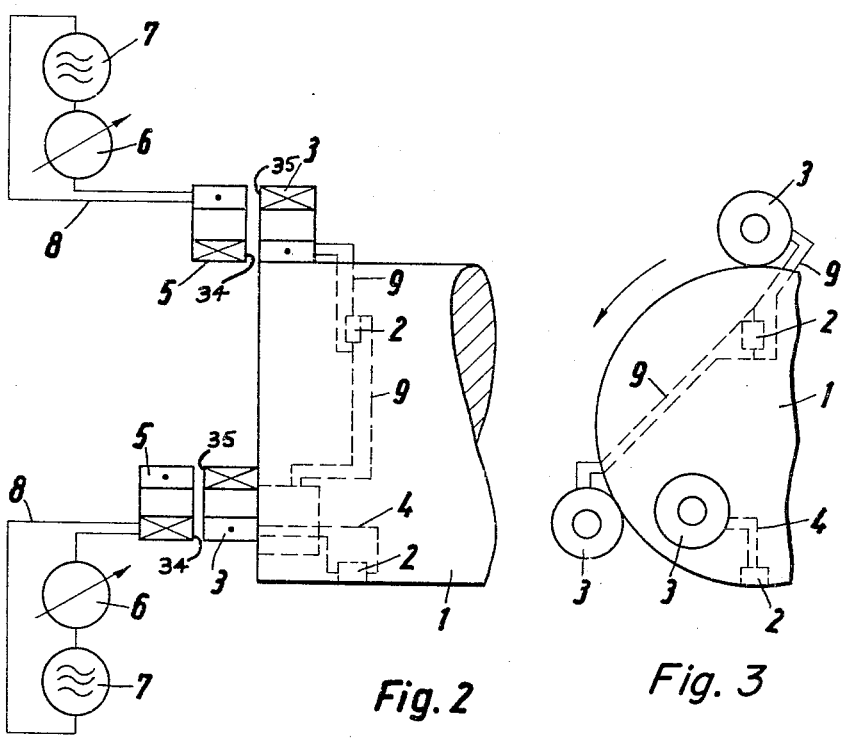
FIG. 2 is a schematic representation, as seen in a side view of the rotatable body, of a measuring apparatus similar to that of FIG. 1, but with coupling coils arranged with axes parallel to the body axis of rotation.
FIG. 3 is a schematic representation of the portion of the FIG. 2 apparatus which is mounted on the rotatable body, as seen in an end view thereof.

The embodiment shown in FIGS. 2 and 3 differs from the embodiment shown in FIG. 1 in that only two passive transducers 2 are present for three moving coils 3, one transducer 2 being connected in parallel with two moving coils 3 by conductors 9, and in that the axes of the moving coils 3 and of the stationary coils 5 are parallel to the axis of rotation. Furthermore, only one stationary coil 5 is associated in each case with the coils 3 connected to the transducers 2. By the illustrated connection of two coils 3 with one transducer 2, it is possible, in spite of having only one associated stationary coil 5, to obtain the measurement twice per revolution.

The embodiment shown is especially suited for free shaft ends. It likewise permits the transmission of a large number of measurements in a restricted space.

Figure 4:
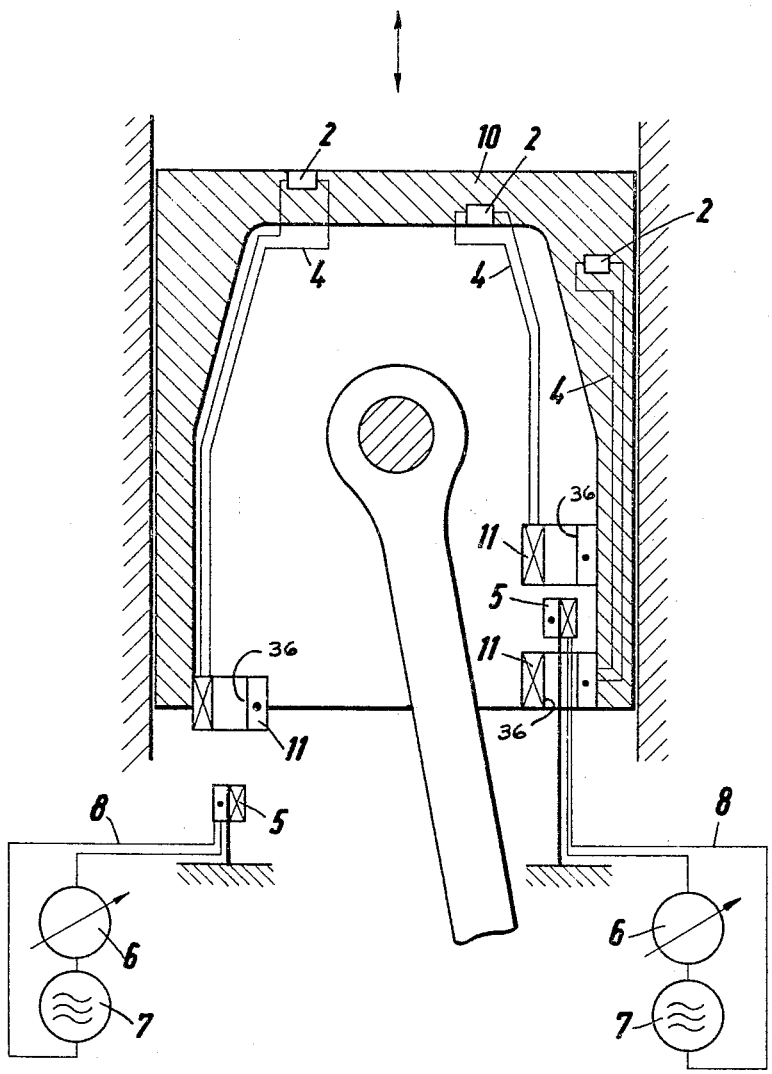
FIG. 4 is a schematic representation, partly in section, of a measuring apparatus according to another embodiment of the invention, which is adapted for parameter value measurements on a piston body which executes pure translatory motion, and illustrating an arrangement whereby data from a plurality of transducers can be sequentially sampled.

The moving coils 11 on the piston 10 shown in FIG. 4 are provided with axial holes 36 into which or through which the stationary coils 5 plunge. The arrangement of the hollow coils 11 and of the coils 5 plunging into them can also be reversed. Sometimes it also suffices to cause only the core of the one coil 5 or 11 to plunge into the hole in the other coil 11 or 5 respectively. The coils 5 and 11 shown in the left half of the drawing have maximum coupling in the vicinity of the bottom dead center, while the coils 11 shown in the right half of the drawing have maximum coupling with the stationary coil 5 in two other crank positions. Due to the aligned arrangement of the coils 11, it is possible with only one stationary coil 5 to interrogate a plurality of points of measurement even in the case of translatory movement.

FIGS. 5 and 6 show an arrangement of the moving and stationary coils 3 and 5, which is somewhat similar to the arrangement in FIGS. 1–3. The moving coils 3 in this case are disposed on a connecting rod 37 journaled to a piston 10, and having a movement which is a translatory and a rotatory motion combined.

The stationary coil 5 shown in FIG. 6 is connected with the primary circuit through a high-frequency cable 14 of any desired length, which is matched by the matching transformer 13. In the primary circuit, the alternating voltage produced across resistance 12 is rectified by the rectifier 15, filtered through the condenser 16 and measured by the indicating or recording instrument 6.

In order to obtain a null reading on instrument 6 when the pair of coils 3 and 5 are in the decoupled state, it may be expedient to use a constant compensation DC voltage.

Figure 7:
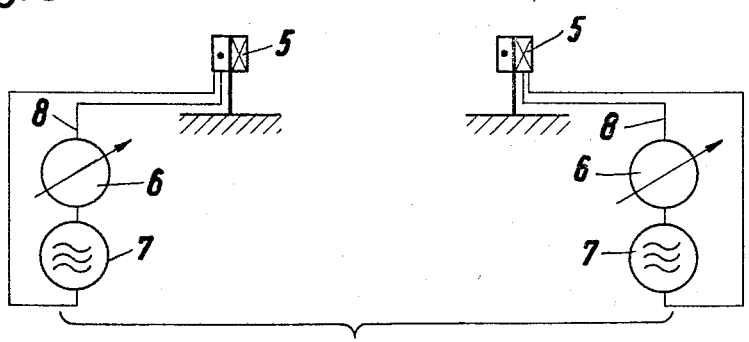
FIG. 7 is a schematic illustration, partly in section, of a measuring apparatus according to a still further embodiment of the invention featuring a temperature sensing circuit including both an active transducer and a passive transducer.

In FIG. 7 the temperatures at points 38 and 39 on the piston 10 are measured by the sensing junctions 18 and 18′ of the thermocouples 40 and 40′ respectively. The thermocouples 40 and 40′ have respective reference junctions 17 and 17′, and produce an electric current in response to the difference in temperature between their corresponding sensing junctions, 18 and 18′ and reference junctions, 17 and 17′, the magnitude of said current depending upon the magnitude of the aforesaid temperature difference.

In order to transmit the temperature information sensed by the thermocouples 40 and 40′ to the indicators 6 in the contact-less manner according to the invention, the thermoelectric currents produced by the thermocouples 40 and 40′ are used to control inductive elements 22 and 22′ which function as the control windings on the magnetic amplifiers formed by the combination of the inductive elements (22 and 21) and (22′ and 23). Accordingly, the inductive elements 22 and 22′ are operatively connected to the thermocouples 40 and 40′ respectively. The inductive elements 21 and 23, which may be coils like those in the previously described embodiments of the invention, function as gate windings in the aforesaid magnetic amplifiers.

By way of example, the inductive element 21 is shown operatively connected to a resistance 19, said resistance being a temperature controlled type and is disposed in close spatial relation to the reference junction 17 so as to be responsive to the temperature thereat. The current produced by the thermocouple 40 varies the effective loading of the resistance 19 upon the element 21 through the magnetic amplifier action of the coupled inductive elements 22 and 21. Thus the circuit comprising the inductive element 21 and the resistance 19, which may also be another type of passive transducer 2, acts as a load upon the generator 7 when said element 21 and the stationary coil 5 are coupled intermittently during the motion of the piston 10. Since the effective loading of the aforesaid circuit corresponds to the value of the temperature sensed by the junction 18, said temperature can be determined by the indicator 6 from the amount of energy delivered by the generator 7.

The operation of the combination of the thermocouple 40′, the inductive elements 22′ and 23 and the resistance 20 in conjunction with their corresponding primary circuit at the right of said piston 10 is similar to that of the thermocouple 40, inductive elements 22 and 21 and resistance 19 with the primary circuit at the left of the piston 10, with the basic difference being that the reference junction 17 is embedded in a temperature controlled magnetic core of the element 23.

Where the element 23 is so constructed as to produce a loading which is controllable by the inductive element 22, in response to the temperature at 39, the resistance 20 may be eliminated.

Figure 8:
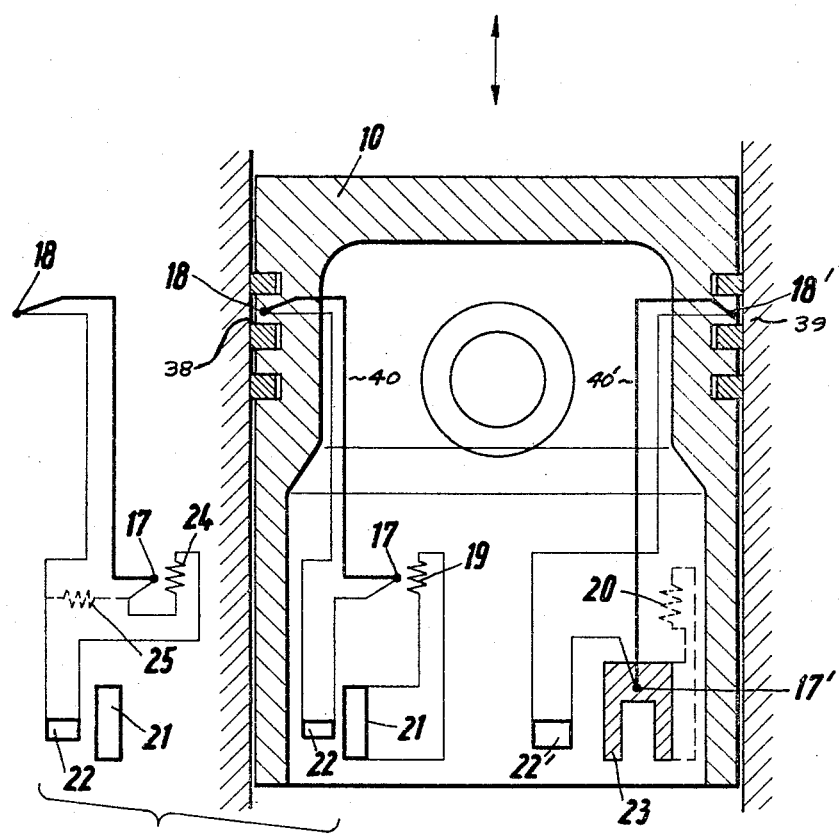
FIG. 8 is a schematic illustration of a temperature variation compensating circuit which can be used in conjunction with the apparatus of FIG. 7.

In FIG. 8 is shown a design of a compensation circuit for the temperature of the reference junction 17, in which temperature-controlled resistances 24 or 25 are connected directly in the circuit of the thermocouple 40. The two resistances 24 or 25 are located in close proximity to the reference junction 17. If the resistance 24, which has a negative temperature coefficient, is used in series with the load 22 of the thermocouple circuit, the thermoelectric voltage that decreases as the result of a warming of the cold or reference junction 17, while the temperature of the hot junction 18 remains constant, and the electrical loading by the element 22 remains constant, is compensated in that, since the temperature of 24 has also risen, a correspondingly lower voltage drop occurs. If, instead of the resistance 24, a resistance 25, having a positive temperature coefficient, is used in parallel with the load of the element 22, any decrease of the thermoelectric voltage caused by the temperature variation of junction 17 will result in no change of the thermoelectric current flowing through the load of element 22, because the simultaneously increasing shunt resistor 25 draws less current away from the element 22.

What is claimed is:

1. An apparatus for electrically measuring the value of a physical parameter on a body moveable along a predetermined path, which comprises a stationary primary circuit having an alternating current generator, a coil connected across the output of said generator, and an indicator connected to said coil and generator for indicating the amount of electrical energy delivered to said coil by said generator, and a secondary circuit mounted on said moveable body, said secondary circuit having a plurality of coils connected in parallel to a transducer means constituting a load upon said coils, said transducer means being responsive to the value of the physical parameter to be measured to vary the load upon said secondary circuit coils as a function of the value of said parameter, said primary circuit coil being disposed at a predetermined location along the motion path of said body, said secondary circuit coils being each disposed at a characteristic location on the moveable body to be positioned, one at a time during the motion of said body, into registry with the primary circuit coil for intermittent inductive coupling therewith to transfer electrical energy from the primary circuit generator to the secondary circuit transducer means in accordance with its loading value, whereby during the intermittent coupling of each secondary circuit coil with the primary circuit coil, an amount of electrical energy corresponding to the loading value of said transducer means, and hence to the value of the parameter to be measured, is transferred from the primary circuit generator to the secondary circuit transducer means through such coupled coils for repeated indications during the motion of said body, by said indicator, of the value of said parameter.

2. An apparatus for electrically measuring the values of physical parameters on a body moveable along a predetermined path, which comprises a plurality of stationary primary circuits, and a plurality of secondary circuits mounted on the moveable body, each primary circuit including an alternating current generator, a coil connected across the output of said generator, and an indicator connected to said coil and generator for indicating the amount of electrical energy delivered to said coil by said generator, each secondary circuit including a coil and a transducer means connected to said coil to constitute a load thereupon, each secondary circuit transducer means being responsive to the value of a corresponding physical parameter to be measured to vary the loading upon its associated coil as a function of the value of said parameter, each primary circuit coil being disposed at a characteristic location along the motion path of said body, each secondary circuit coil being disposed at a location on said body for intermittent inductive coupling with a corresponding primary circuit coil when positioned into registry therewith during the motion of said body to accommodate the transfer of electrical energy from the generator connected to said primary circuit coil to the transducer means loading said secondary circuit coil for indicating the value of the parameter establishing the loading value of said transducer means, whereby, during the intermittent coupling of corresponding primary and secondary circuit coils, an amount of electrical energy corresponding to the loading value of the respective secondary circuit transducer means, and hence to the value of the corresponding parameter to be measured, is transferred to said transducer means through such coupled coils to indicate the value of such parameter by said indicator of the respective primary circuit.

3. An apparatus for electrically measuring the value of a physical parameter on a body disposed for translatory motion along a predetermined path, which comprises a stationary primary circuit having an alternating current generator, a coil connected across the output of said generator, and an indicator connected to said coil and generator for indicating the amount of electrical energy delivered to said coil by said generator, a secondary circuit mounted on said moveable body, said secondary circuit having a coil and a transducer means connected to said coil to constitute a load thereupon, said transducer means being responsive to the value of the physical parameter to be measured to vary the loading of the secondary circuit coil as a function of the value of said parameter, said primary circuit coil being disposed at a predetermined location along the motion path of said body for intermittent inductive coupling with the secondary circuit coil on said body during the motion thereof, one of said primary circuit and secondary circuit coils being provided with an axial passage through which the other coil is plunged during the motion of the body to intermittently couple said coils inductively to transfer from the primary circuit coil to the secondary circuit coil, and hence to said loading transducer means, the electrical energy delivered to the primary circuit coil by the generator, whereby, during the intermittent coupling of said coils, an amount of electrical energy corresponding to the leading of said transducer means, and hence to the parameter to be measured, is transferred from the generator to the transducer means through the coupled coils, thereby enabling the value of said parameter to be determined by said indicator.

4. An apparatus for electrically measuring the values of a physical parameter on a body moveable along a predetermined path which comprises a stationary primary circuit including an alternating current generator, a coil, an indicator, a transformer, a resistor, and means connected to said resistor for rectifying and filtering the voltage developed thereacross, the primary winding of said transformer being connected in series with said resistor, and said series-connected resistor and transformer primary winding being connected to the output of the generator and the secondary winding of said transformer being connected to said coil to deliver electrical energy thereto, said indicator being connected to said rectifying and filtering means for response to the rectified and filtered voltage developed across said resistor, said resistor voltage corresponding to the amount of electrical energy delivered to said primary circuit coil from said generator, and a secondary circuit mounted on said moveable body, said secondary circuit including a coil and a transducer means connected to said coil to constitute a load thereupon, said transducer means being responsive to the value of the physical parameter to be measured to vary the loading of the secondary circuit coil as a function of the value of said parameter, said primary circuit coil being disposed at a predetermined location along the motion path of said body, and said secondary circuit coil being disposed at a location on said body for intermittent inductive coupling with the primary circuit coil when positioned into registry therewith during the motion of said body to transfer from said primary circuit coil to said secondary circuit coil, and hence to said loading transducer means, the electrical energy delivered to the primary circuit coil from said generator, whereby, during the intermittent coupling of said coils, an amount of electrical energy corresponding to the loading of said transducer means, and hence to the value of the parameter to be measured, is transferred from the generator to the transducer means through said coupled coils, thereby enabling the value of said parameter to be determined by said indicator from the rectified and filtered voltage developed across said resistor.

References Cited

UNITED STATES PATENTS 2,575,922   11/1951   Langenwalter _____ 73—351

OTHER REFERENCES

National Bureau of Standards (NBS) Technical News Bulletin, December 1954, pages 180–183.

LOUIS R. PRINCE, *Primary Examiner.*

D. McGIEHAN, *Assistant Examiner.*